United States Patent
Donadello et al.

(10) Patent No.: US 11,320,254 B2
(45) Date of Patent: May 3, 2022

(54) METHOD AND SYSTEM FOR DETERMINING THE SEPARATION DISTANCE BETWEEN A BODY AND THE SURFACE OF AN OBJECT BY MEANS OF LOW COHERENCE OPTICAL INTERFEROMETRY TECHNIQUES UNDER DISTORTION DUE TO SUB-SAMPLING

(71) Applicant: ADIGE S.p.A., Levico Terme (IT)

(72) Inventors: Simone Donadello, Rodigo (IT); Barbara Previtali, Milan (IT); Daniele Colombo, Renate (IT)

(73) Assignee: ADIGE S.p.A., Levico Terme (IT)

( * ) Notice: Subject to any disclaimer, the term of this patent is extended or adjusted under 35 U.S.C. 154(b) by 0 days.

(21) Appl. No.: 17/110,419

(22) Filed: Dec. 3, 2020

(65) Prior Publication Data
US 2021/0172721 A1    Jun. 10, 2021

(30) Foreign Application Priority Data

Dec. 6, 2019   (IT) .................. 102019000023202

(51) Int. Cl.
*G01B 9/02015*   (2022.01)
*G01B 9/02002*   (2022.01)
(Continued)

(52) U.S. Cl.
CPC ..... *G01B 9/02032* (2013.01); *G01B 9/02002* (2013.01); *G01B 9/0209* (2013.01);
(Continued)

(58) Field of Classification Search
CPC .............. G01B 9/02032; G01B 9/0209; G01B 2290/45; G01B 2290/70; G01B 11/14
See application file for complete search history.

(56) References Cited

U.S. PATENT DOCUMENTS

2012/0307258 A1* 12/2012 Koerner ............ G01B 9/02032
                                                             356/497
2015/0260504 A1*  9/2015 Schonleber ........ G01B 11/2441
                                                             356/478
(Continued)

FOREIGN PATENT DOCUMENTS

DE         102007023293 B3    9/2008
WO            2010092533 A1   8/2010

OTHER PUBLICATIONS

Search Report for IT2019000023202 dated Aug. 19, 2020, Munich, DE.

(Continued)

*Primary Examiner* — Michael A Lyons
(74) *Attorney, Agent, or Firm* — Arent Fox LLP; Michael Fainberg

(57) ABSTRACT

Method and system for determining separation distance between an object and a processing or measuring tool involve generating a measurement beam of low coherence optical radiation, leading the measurement beam towards the object and the reflected measurement beam towards an optical interferometric sensor assembly in a first direction of incidence, generating a reference beam of low coherence optical radiation, and leading the reference beam towards the optical interferometric sensor assembly in a second direction of incidence, superimposing the measurement and reference beams on a common region of incidence, detecting position of a pattern of interference fringes between the measurement and reference beams on the region of incidence, and determining difference in optical length between a measurement optical path and a reference optical path on position of the pattern of interference fringes along an illumination axis to determine current separation distance between the processing or measuring tool and the object.

16 Claims, 8 Drawing Sheets

(51) Int. Cl.
  *G01B 9/0209*   (2022.01)
  *G01B 11/14*    (2006.01)
(52) U.S. Cl.
  CPC .......... *G01B 11/14* (2013.01); *G01B 2290/45* (2013.01); *G01B 2290/70* (2013.01)

(56) References Cited

U.S. PATENT DOCUMENTS

2016/0059350 A1    3/2016  Schoenleber et al.
2019/0015931 A1*   1/2019  Kogel-Hollacher ... B23K 26/21
2019/0265023 A1    8/2019  Deck et al.
2020/0041249 A1*   2/2020  Strebel ............... G01B 9/02028

OTHER PUBLICATIONS

Groot De P. et al., Three-Dimensional Imaging by Sub-Nyquist Sampling of White-Light Interferograms Optics Letters, Sep. 1, 1993, pp. 1462-1464, vol. 18, No. 17, Optical Society of America, US.

* cited by examiner

METHOD AND SYSTEM FOR DETERMINING THE SEPARATION DISTANCE BETWEEN A BODY AND THE SURFACE OF AN OBJECT BY MEANS OF LOW COHERENCE OPTICAL INTERFEROMETRY TECHNIQUES UNDER DISTORTION DUE TO SUB-SAMPLING

CROSS-REFERENCE TO RELATED APPLICATION

This application claims priority to and benefit of Italian Patent Application No. 102019000023202 filed Dec. 6, 2019, the contents of which are incorporated by reference in their entirety.

FIELD OF THE INVENTION

The present invention generally relates to industrial processing methods or measuring methods, and specifically to a method and to a system for determining the separation distance between an object or a material and a body, such as a tool for processing, or an instrument for measuring, said object or material.

According to another aspect, the present invention relates to a machine tool for processing a piece or material.

According to yet another aspect, the present invention relates to a machine for laser processing a piece or material.

In the following detailed description and claims, the term "object" means a finished product being measured or a piece being processed. When applied to machine tools and in particular to laser processing machines, the term "piece," and, in the preferred embodiment, "metal piece" is used to identify any product, such as a plate or an elongate profile having either a closed cross section—for example a hollow circular, rectangular or square shape—or an open cross section—for example a flat cross section or an L-, C- or U-shaped section, etc. The term "material" or "precursor material" in the additive manufacturing identifies the raw material, generally a powder, that is subjected to sintering or localized melting by a laser beam.

BACKGROUND OF THE INVENTION

In industrial processes, it is common for a processing tool to approach an object—without coming into contact therewith—or a material in order to process it from a distance, for example by emitting radiation or operating fluids. It is also known that a measuring instrument approaches a piece or a material being processed during the manufacturing process of a product, or approaches the finished product in order to detect any geometric features or physical properties thereof during the interruption, in the course of or at the end of a processing process.

In processes for laser working of materials, and in particular of plates and metal profiles, laser radiation is used as a thermal tool for a wide variety of applications that are dependent on the parameters relating to the interaction between the laser beam and the piece being processed, in particular on the energy density per volume of incidence of the laser beam on the piece, and on the interaction time interval.

For example, by directing a low density of energy (of the order of tens of W per mm² of surface) for a prolonged amount of time (in the range of seconds) on a metal piece, a hardening process occurs, while, by directing a high density of energy (of the order of tens of MW per mm² of surface) for a time of femtoseconds or picoseconds on the same metal piece, a photoablation process occurs. In the intermediate range of increasing energy density and decreasing processing time, controlling these parameters makes it possible to implement welding, cutting, drilling, engraving, and marking processes. These processes occur by emitting the laser beam from a working head that operates far away from the piece subjected to the process.

In several processes, including working processes by drilling and cutting, it is also necessary to generate a flow of an assist gas in the processing region in which the laser beam interacts with the material, which has mechanical functions of driving the melt, or chemical functions of assisting with combustion, or even technological functions of shielding from the environment surrounding the processing region. The flow of assist gas is also emitted from a particular nozzle located at a spacing from the piece being processed.

In additive processes, the material may, for example, be in the form of filament, or in the form of powder emitted from a nozzle on account of the flow of an assist gas, or it even may alternatively be present in the form of powder bed. The material is therefore melted by laser radiation, thus obtaining a three-dimensional mold following the resolidification of said material.

In the field of laser processing of materials, laser cutting, drilling and welding are processes that may be carried out by the same machine, which is able to generate a focused high-power laser beam having a preset transverse power distribution in at least one processing plane of the material, typically a laser beam having a power density of between 1 and 10000 kW/mm², and to control the direction and the position of incidence of the beam along the material, and to control—where necessary—the direction of the flow of assist gas. The difference between the various types of processing that may be performed on a material is substantially attributable to the power of the laser beam used and to the interaction time between the laser beam and the material subjected to processing.

A machine tool operating on a piece being processed is shown in FIG. 1.

FIG. 1 shows a processing and/or measuring head 10 of a machine tool, for example a machine for laser processing a piece or a material, arranged at a separation distance d from the material WP being processed, and an associated electronic unit for controlling the processing or measurement, ECU. The reference numeral 12 generally indicates a processing tool or a measuring instrument, for example a tool for a mechanical process, a nozzle for emitting an operating fluid, an output for a processing radiation such as high-power laser radiation for hardening, welding, cutting, drilling, engraving, marking, photo ablating or sintering a material, or a measuring probe.

The processing tool or measuring instrument 12 may be considered to be the distal portion of the working head, taking the entire machine as reference, or the end proximal to the piece or material being processed, and these terms will both be used in the description.

In a laser processing machine, the output for the processing radiation or "beam output" is the portion of the working head from which the processing laser beam emerges into open air, i.e. propagates outside the volume of the head towards the piece or material being processed, and may be the end portion of an optical focusing system or a protective structure thereof, or the tapered end of a nozzle for supplying a flow of assist gas, for applications that require the supply of gas to the process.

Movement actuator means 14 are coupled to the processing and/or measuring head 10 and are controlled by the unit ECU for controlling the process by means of servomotors 16, in order to control the mechanical parameters of the process, for example to control the movement of the working head along the degrees of freedom given thereto by the specific embodiment of the machine in order to follow a programmed working trajectory T on the piece or the material, in particular for the movement along the Z axis towards and away from the piece or the material on the basis of its profile or the processing profile.

In industrial processes in which a processing or measuring instrument approaches an object or a material being processed, the results of the process or measuring depend on the correct distance between the processing instrument and the object or the material. For example, when laser processing a material, and specifically when controlling the laser processing of a metal material in order to cut, drill or weld by laser said material, or the additive manufacture of predetermined structures from a precursor powder material, it is important that the processing instrument is held at a controlled distance from the material.

A capacitive sensor associated with the working head 10 is indicated by 20 and is configured to detect the variation in capacitance between the end 12 of the working head that is proximal to the piece or material and the surface of the piece or material WP, placed at a reference potential, in cases in which the piece or material being processed is metal or conductive. The electrical capacitance signal detected by the sensor 20 is processed by an associated computer module 22 programmed to determine the separation distance between the working head and the piece or material on the basis of the value of the acquired electrical capacitance, having knowledge of the parameters of the machine and the process, and is forwarded therefrom to the process control unit ECU for controlling the movement of the working head using feedback.

This technique is disadvantageously not applicable when processing or measuring objects or materials that are not metal.

This also lacks accuracy since the capacitive effect is not only produced locally between the end of the processing or measuring instrument and the corresponding point of incidence on the piece or material, but also as a result of the large surfaces of the working head and of the piece or material near to the end of the instrument and to the point of incidence. In the event of significant curves (positive or negative) of the surface of the piece, it is necessary to run algorithms for calculating measurement compensation near to edges or in the case when the working head approaches the piece in directions that are not orthogonal to the local surface. Said measurements are rather onerous in computational terms and, in any case, unable to completely compensate for the complexity of the configurations that may be encountered in reality.

SUMMARY OF THE INVENTION

An object of the present invention is to provide a method for determining the separation distance between a piece or a material and means for processing or measuring said piece or material, for example between the working head of a machine for laser processing a piece or material and the surface of said piece or material. The method of the present invention is accurate and robust, and not affected by effects linked to the shape of the piece or material on which the machine operates or to the processing conditions, for example the relative speed of translation of the working head with respect to the piece or material.

Another object of the present invention is to provide a method for determining the separation distance between a piece or a material and means for processing or measuring said piece or material in a large range of measurable distances without jeopardizing the measurement accuracy.

These objects are achieved by a method for determining the separation distance between an object or a material and means for processing or measuring said object or material as described and claimed herein.

Specific embodiments are also described.

The present invention also provides a system for determining the separation distance between an object or a material and means for processing or measuring said object or material.

A machine tool for processing a piece or material and a machine for laser processing a piece or material form additional subject matter of the present invention, which comprises a system for determining the separation distance between a processing tool and the surface of the piece or material between the working head and the surface of the piece or material, respectively, in predetermined processing regions, which system is configured to carry out the above-mentioned method.

In summary, the present invention is based on the application of the principles of optical interferometry, and in particular, on low coherence optical interferometry techniques in which the measuring range is extended by using distortion effects due to sub-sampling.

The term "optical interferometry" indicates a plurality of techniques that make use of the phenomenon of the interference between a measurement optical beam and a reference optical beam, which beams are superimposed and generate interference fringes. The theory of optical interferometry in coherent light is well known and is used for the relative comparison between distances, without, however, being able to give univocal absolute measurement information for said distances, for example in the event of a temporary interruption of the optical signal.

The present invention is inspired by the consideration that an absolute distance measurement may be carried out in the optical domain by using a low coherence interferometry technique. Low coherence interferometry is a simple technique for measuring distances between a probe and a target with high precision, and is based on the comparison between the distance travelled by a measurement optical beam that propagates from a source to a detector assembly and, in this path, is emitted by the probe and back-reflected by the target, and the distance travelled by a reference optical beam that propagates from the source to the detector assembly across a reference path tuned to the measurement path in a known nominal distance condition between the probe and the target.

In low coherence interferometry, the measurement and reference optical beams are generated by low coherence sources, for example LEDs or super luminescent diodes. The interference fringes between the above-mentioned beams only appear when the respective optical paths—or lengths of optical paths—correspond, the optical path being defined as the sum of the products between the geometric lengths and the respective refractive indices within each portion along the entire optical path traveled—that is when the length of the measurement path corresponds to the length of the reference path within the coherence length range. Assuming that the length of the reference path is known, it is possible to derive the length of the measurement path by detecting the presence of the envelope of the interference fringes with a resolution of the order of the coherence length that is typically in the micrometers range (from 5 um to 100 um).

This technique is particularly robust with regard to optical noise since the light coming from other sources or, for example, from a laser processing process incoherently adds up to the interferometric signal without altering the pattern of interference fringes. The measurement is applied locally at the point at which the measurement optical beam is directed and is independent from the morphology of the surroundings. This also allows for precise absolute measurements of the distance in a direction that is substantially coaxial to the axis of the instrument carried by the working head of a machine tool.

Advantageously, the low coherence interferometry technique with the detection of the pattern of interference fringes in the space domain is the most promising and more efficient in terms of operative flexibility for the objects of the present invention, compared with the detection in the time domain or the frequency domain.

In fact, in low coherence interferometry comprising detection in the time domain, the pattern of interference fringes is detected by a photodiode or by an array of photodiodes, or by a similar acquisition screen, by adapting the length of the reference path in order to reach a condition where the lengths of the reference path and of the measurement path correspond except for a tolerance of the order of the coherence length. In this case, the limitation on the range of available measurements is associated with the adaptation of the length of the reference path, which—for example—is carried out by the translation of a back-reflecting element arranged along the above-mentioned path, the translation spatial range of the back-reflecting element of the reference path being comprised between a few microns and several millimeters, and the range of translation being detrimental to the actuation speed or operational complexity.

Although the technique of detection in the time domain is rather simple to carry out and makes it possible to easily achieve the correspondence between the absolute optical lengths of the measurement path and of the reference path, it is, however, poorly suitable for applications in which the course of an industrial process is measured in real time. In fact, for a dynamic measurement, the length of the reference path has to be continuously modulated to find the condition in which it corresponds with the length of the current measurement path that causes the appearance of the pattern of interference fringes. This may be obtained by various types of control devices, including refractive index modulators or fast-acting mechanical actuators, for example piezoelectric actuators; however, these type of devices are rather expensive and very delicate since they have to operate at a much faster actuation speed than the sampling rate for measuring the distance, which is typically above kHz, a condition that often may not be obtained easily, especially in the range of large displacements.

A different detection technique is based on the Fourier transform relationship between the spectral density function and the cross-correlation of the measurement and reference beams, by means of which it is possible to extract the differential distance measurement in real space from the spectral profile of the wavelengths of the two interfering beams. In this way, mechanical actuators are not required to align the length of the reference path with the length of the measurement path. A single spectral acquisition of the superimposed measurement and reference beams is possible using a diffraction grating and a focusing lens downstream thereof for projecting the spectral distribution of the interfering beams on a linear sensor device, for example a video camera. The spectrum of the two interfering beams shows a periodic modulation and periodicity (frequency) of modulation in the wavelength space varies with the difference between the optical lengths of the measurement path and of the reference path. An algorithm for calculating the Fourier transform, for example an FFT algorithm, is applied in order to extract the measurement of the signal intensity peak in relation to the difference between the optical paths in real space.

This technique also requires high-quality optical elements that have to be aligned with extreme precision and fast sensors for acquiring the signals. Furthermore, back-reflecting signals may determine artifacts in the measurement and the sensitivity of the acquisition may be reduced by the presence of self-correlation signals, in particular in the case of highly reflective surfaces. In order to calculate the absolute distances, it is necessary to rapidly process the signals on the basis of the execution of FFT algorithms, which require specific computational instruments.

Unlike the low coherence interferometry techniques in the time domain in which a scan of the lengths of the reference path is temporally distributed, and in the frequency domain in which the information for comparing the length of the measurement path and the reference path is encoded in the wavelength space, the low coherence interferometry technique comprising detection in the space domain combines the two previous techniques and makes it possible to directly visualize the outcome of the measurement in real space, rendering a rapid acquisition thereof possible by an economical device such as an image sensor, including a linear sensor.

In the typical design of a low coherence interferometric system having detection in the space domain, the measurement and reference beams impinge superimposed in the sensor means surface from different directions, and the surface of the sensor means is directly adapted to detect the pattern of interference fringes that arises from this superimposition. In this configuration, a spatial variation in the measurement optical path with respect to the reference optical path is directly displayed on the sensor means as a result of the mutual angle of inclination of the two beams. Therefore, the measurement of the difference between the length of the measurement optical path and the length of the reference optical path may be simply extracted by detecting the position of the pattern of interference fringes on the sensor means, the extension of the pattern of interference fringes in the linear dimension of the sensor means being of the order of magnitude of the coherence length of the optical radiation of the beams.

In the low coherence interferometry technique comprising detection in the space domain, the length of the optical path of each beam that obliquely impinges on the common region of incidence of the sensor means varies linearly with the position along the illumination axis of the sensor means, therefore the difference between the measurement and reference optical paths also varies linearly. The pattern of interference fringes appears in a specific linear range of the image acquired by the sensor means, which corresponds to the condition in which the optical lengths of the measurement path and the reference path are equal within the coherence length of the optical radiation, while, in the other regions of the sensor means, the beams are incoherently superimposed. By detecting the position of the envelope of the pattern of interference fringes along the linear extension of the sensor means, it is possible to extract the respective length of the measurement path.

This measure is only limited by the conditions in which the envelope of the pattern of interference fringes is obtained within the illumination region of the sensor means, that is within the sensitive region of the photodetector devices that form the sensor means. The measurement range is determined by the inclination of the beams on the region of incidence, or better still by the angle of incidence therebetween, and by the spatial resolution of the photodetection areas (also referred to as pixels of the sensor means) of the interference image, or rather by the minimum number of regions (pixels) that have to be illuminated in order to demodulate the pattern of interference fringes with respect to the overall number of regions (pixels) available on the sensor means. Under common conditions comprising a sensor arrangement having several thousand photodetectors, a measurement range of several tenths of millimeters may be obtained before the appearance of an aliasing effect, corresponding to a sub-sampling state of the interference fringes. However, the inventors have demonstrated that the presence of the aliasing effect of the pattern of interference fringes does not limit the measurement but in fact may be used to increase the range of measurable distances. In fact, this system of sub-sampling turns out into an effective demodulation of the fringe pattern at lower spatial frequencies, the demodulation being obtained in an analogic way directly at the level of the photodetectors of the interferometric sensor arrangement without the need to interpose additional elements. On account of this demodulation, the number of photodetectors required to detect the interference fringe envelope is reduced, this being reflected in a greater measurement range of the distance.

Advantageously, the adoption of an interferometry technique comprising detection in the spatial domain makes it possible to take accurate distance measurements using a static system of measurement and reference optical paths and for each individual acquisition or sampling of the spatial distribution of the optical radiation of the superimposed measurement and reference beams, which impinge on the sensor means. In order to provide a system of this kind, standard optical elements are exclusively necessary, and the signals emitted by the sensor means are processed on the basis of simple calculation algorithm so that it is not computationally onerous. With this technique, the drawbacks of the detection in the frequency domain technique, that is the presence of autocorrelation signal components, the artifacts at negative frequencies and the reduction in sensitivity at high values for the measurable distances are also overcome.

According to the present invention, the application of the considerations set out above to a machine tool for processing a piece or material, such as a machine for laser processing a material, in particular for laser cutting, drilling or welding or additive manufacturing, is achieved by the arrangement of an interferometric system comprising a measurement optical path that is integrated, at least in part, in a body of the machine, for example in the working head of the machine, and a reference optical path associated with the measurement optical path, which may also be integrated in the body (in the working head) of the machine or outside thereof, wherein the measurement optical path emerges from the machine body (from the measurement head) in the region of the processing tool (the output for the laser beam in the case of a laser processing machine) or more generally at the end of the head that is proximal to the surface of the piece or material being processed.

BRIEF DESCRIPTION OF THE DRAWINGS

Additional features and advantages of the present invention will be presented in more detail in the following detailed description of one embodiment thereof, given by way of non-limiting example, with reference to the attached drawings, in which.

DETAILED DESCRIPTION

Figure 1:
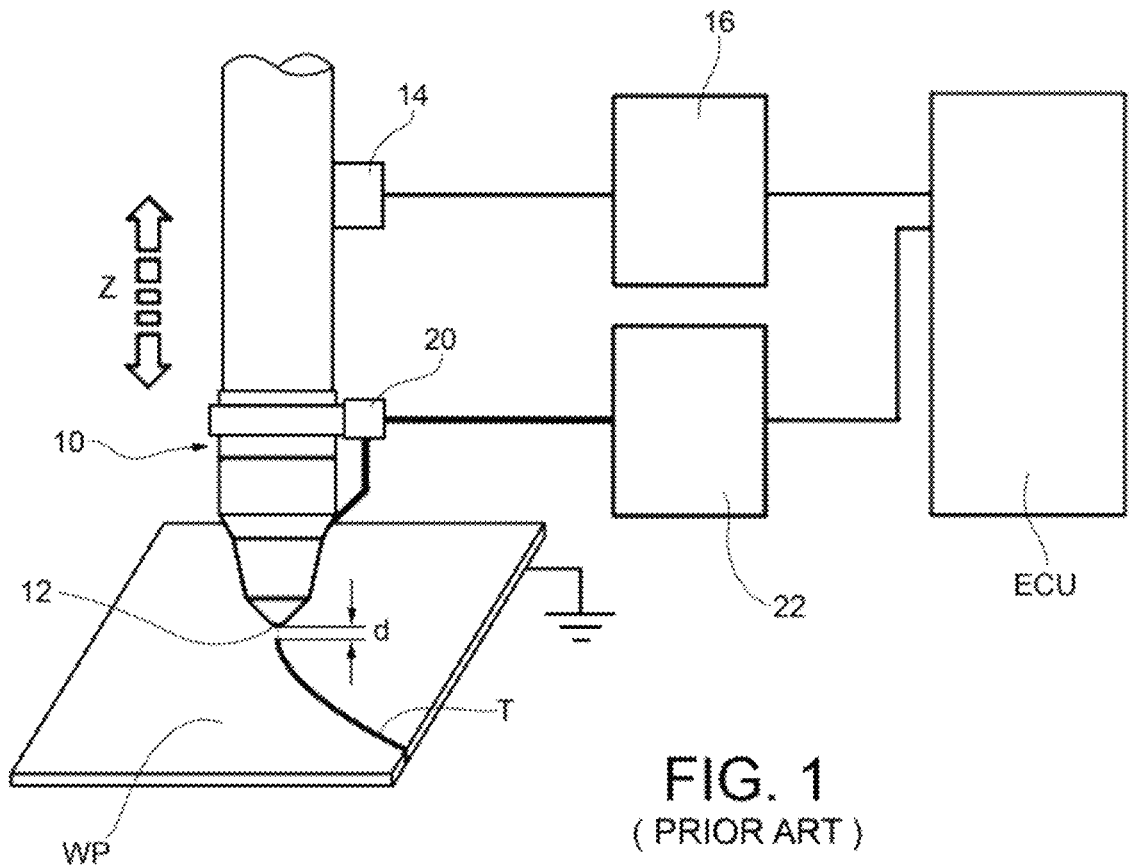
FIG. 1 shows a schematic example of a working head of a machine tool in the proximity of a workpiece, and relative control means, according to the prior art.

FIG. 1 has been previously described with reference to the prior art and the contents thereof are referred to here as long as they are common to the production of a general machine tool, and a laser processing machine in particular, controlled in order to carry out a method according to the teaching of the present invention.

Figure 2A:
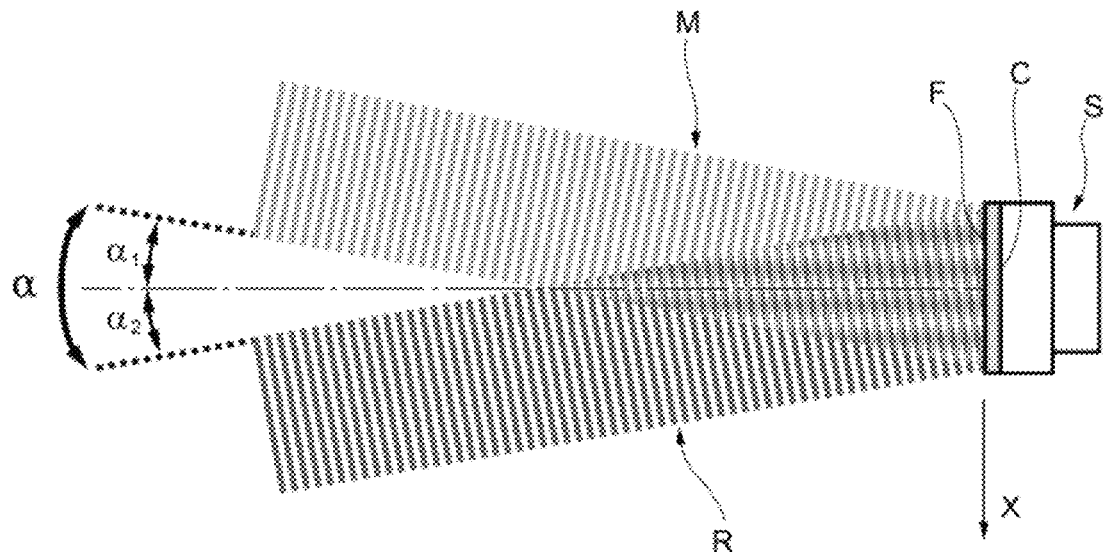
FIG. 2a is a schematic view of the configuration of a linear low coherence interferometric system with spatial detection.

FIG. 2a is a schematic view of the configuration of a low coherence interferometric system with a linear spatial detection. A measurement collimated beam of optical radiation, indicated by M, and a reference collimated beam of the same optical radiation, indicated by R, impinge so as to be superimposed on a common region of incidence C of a sensor arrangement S, at a predetermined angle of incidence a, where they form a pattern of interference fringes F, the extension of which on the common region of incidence is of the order of the coherence length of the optical radiation. The width of the measurement collimated beam of optical radiation and the width of the reference collimated beam of optical radiation are preferably designed so as to substantially illuminate the entire sensor arrangement. In order to increase the intensity and the contrast of the signal detected, the beams may be concentrated on the sensor in the direction that is perpendicular to the illumination axis, for example by means of a cylindrical focusing lens.

The sensor arrangement S comprises an arrangement of photodetectors along at least one illumination axis of the region of incidence (x axis in the figure). The arrangement of photodetectors is a linear or bidimensional arrangement of photodetectors, preferably a linear arrangement. The illumination axis of the region of incidence is determined by the intersection between the plane defined by the angle of incidence of the measurement beam M and of the reference beam R and the sensor surface of said sensor arrangement.

Figure 2B:
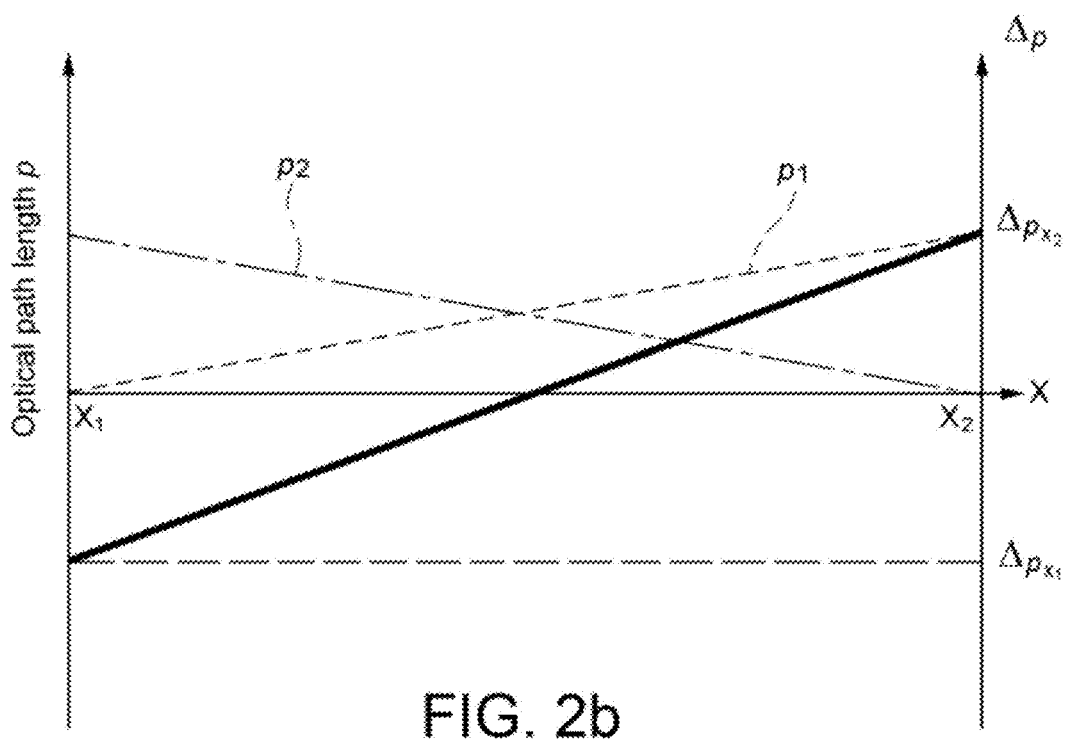
FIG. 2b is a schematic view of the variation in the lengths of the measurement and reference optical paths with respect to the relative point of incidence, on an illumination axis of a sensor arrangement, of the pattern of interference fringes.

In FIG. 2b, the graph schematically shows the variation in the lengths p of the measurement and reference optical paths, referring to the initial incident wavefront of the respective measurement and reference beams on the common region of incidence of the sensor arrangement S, in the typical configuration in which the two incident beams are symmetrical on the sensor arrangement. The x-axis indicates the position or x coordinate along the illumination axis of the photodetector arrangement. Reference numeral p1 indicates the additional length of a first optical path, for example the measurement optical path of the measurement optical radiation beam M, with respect to the initial point of incidence of the wavefront of the measurement beam M at a first end of the common region of incidence C, $x_1$, which is the origin of the measurement axis. Reference numeral p2 indicates the additional length of a second optical path, for example the reference optical path of the reference optical radiation beam R, with respect to the initial point of incidence of the wavefront of the reference beam R at a second end of the common region of incidence, $x_2$, which is opposite the first. Reference numeral $\Delta p$ indicates the difference between the additional lengths of the two paths, p1-p2, which is zero at the middle coordinate of the sensor arrangement, and varies from a value $\Delta p_{x1}$ at the end $x_1$ of the common region of incidence to a value $\Delta p_{x2}$ at the end $x_2$ of the common region of incidence.

Figure 2C:
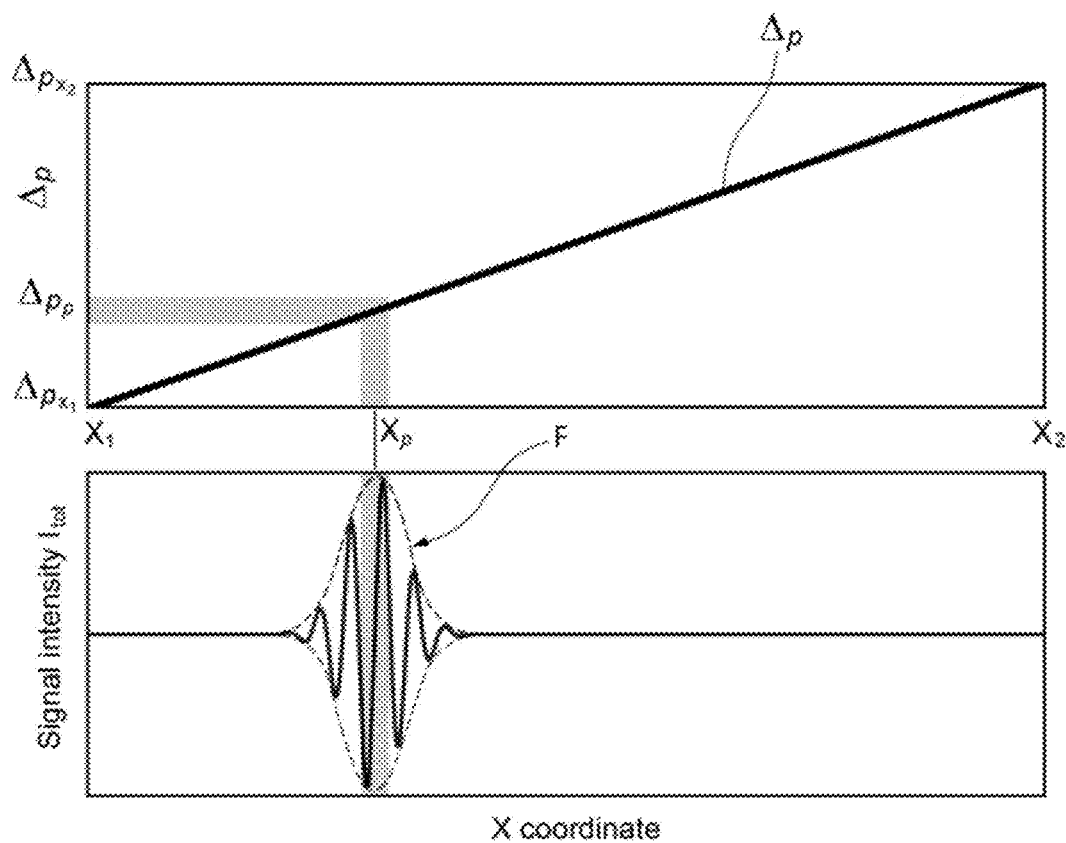
FIG. 2c is a schematic view (top graph) of the variation in the difference between the lengths of the measurement and reference optical paths with respect to the relative point of incidence, on an illumination axis of a sensor arrangement, of the pattern of interference fringes, and the identification of a pattern of interference fringes on the illumination axis of the sensor arrangement in a state in which the optical lengths of the measurement and reference paths are equal (bottom graph)

In FIG. 2c, the top graph shows the curve $\Delta p$ that corresponds to the graph in FIG. 2b, and the bottom graph shows the identification of a pattern of interference fringes F on the illumination axis (x) of the sensor arrangement S that occurs when the optical lengths of the measurement and reference paths are equal. The envelope of the pattern of interference fringes F is indicated with hatching, and the respective difference $\Delta p_p$ between the additional lengths of the paths of the measurement and reference optical beams is associated with the coordinate of the envelope peak, $x_p$, by means of the upper graph.

$P_M$ and $P_R$ indicate the measurement and reference paths, the overall lengths of which may be expressed as $P_M$=P1+p1 and $P_R$=P2+p2, where P1 is the optical length of the measurement optical path from the low coherence optical radiation source to the first wavefront incident on the sensor arrangement, and P2 is the optical length of the reference optical path from the same low coherence optical radiation source to the first wavefront incident on the sensor arrangement, and is preferably constant. It is possible to consider P1 composed of $P_{head}+D_{standoff}$, where head $P_{head}$ the length of the optical path upstream and inside the working head, including a first portion between the low coherence optical radiation source and the end of the working head that is proximal to the piece or material WP being processed (the processing or measuring instrument 12, for example the laser beam output) and a second portion between the above-mentioned proximal end of the working head (the processing or measuring instrument 12, for example the laser beam output) and the sensor arrangement S, which portions have a particular predetermined and invariant geometric length, and $D_{standoff}$ is the separation distance in open air between the end of the working head that is proximal to the piece or material WP being processed and the above-mentioned piece or material, for example the surface of said piece or material. P2 is the optical length of the reference optical path, which is equivalent to the optical length of the measurement optical path in a nominal operating condition, indicated in the following as $P1_{nom}$, wherein the distance between the proximal end of the working head (the processing or measuring instrument 12, for example the laser beam output) and the surface of the piece or material WP corresponds to a predetermined nominal separation distance $D_{standoff\_nom}$.

The difference in optical length between the measurement optical path and the reference optical path is represented mathematically as:

$$P_M-P_R$$

and the interference fringes appear in the condition in which this is zero, that is:

$$P_M-P_R=0$$

a relationship that may be broken down as:

$$P1+p1-(P2+p2)=0$$

which may be written again as:

$$P_{head}+D_{standoff}+p1-P2-p2=0$$

from which the following is deduced:

$$P_{head}+D_{standoff}-P2+\Delta p=0$$

$$P_{head}+D_{standoff}-P1_{nom}+\Delta p=0$$

$$P_{head}+D_{standoff}-P_{head}-D_{standoff\_nom}+\Delta p=0$$

$$\Delta p=D_{standoff\_nom}-D_{standoff}$$

that is the difference between (a) the current separation distance between the working head and the surface of the piece or material in the processing region, $D_{standoff}$, and (b)

the nominal separation distance, $D_{standoff}$ nom, is equal to the difference between the additional lengths of the measurement optical path and of the reference optical path.

Therefore, a current separation distance between the working head 10 and the surface of the piece or material WP that is different from the nominal separation distance, determined by a difference in optical length between the measurement optical path and the reference optical path, is attributable to a difference between the additional lengths of the measurement optical path and of the reference optical path, therefore to a movement of the pattern of interference fringes along the illumination axis x of the sensor arrangement S with respect to a nominal position, for example the median plane of said sensor arrangement S.

It is noted that, in a machine for laser processing a piece or material, which operates by means of a high-power processing laser beam emitted by the working head and led along a working trajectory on the piece or material comprising a succession of process regions, during a cutting or drilling application in which a flow of assist gas acts, the end of the working head that is proximal to the piece or material being processed is generally the end portion of the assist gas nozzle, while during a welding or additive manufacturing application in which gas is not supplied, the end of the working head that is proximal to the piece or material being processed is generally the output for the processing laser beam.

In the application that forms the subject of the invention, the length of the reference optical path is set so as to correspond to the length of the measurement optical path at a preset nominal separation distance between the working head and the piece or material in the processing region, and the difference between (a) the current separation distance between the working head and the piece or material in the processing region and (b) the predetermined nominal separation distance results from the difference in length between the measurement optical path and the reference optical path, which may be identified on the basis of the position of the pattern of interference fringes along the illumination axis of the region of incidence of the sensor arrangement S. Advantageously, a middle position of the pattern of interference fringes along the illumination axis corresponds to said preset nominal separation distance. Alternatively, an end position of the pattern of interference fringes along the illumination axis may correspond to a null nominal separation distance between a processing tool and the piece or material being processed, which is equivalent to the contact between the tool that constitutes the proximal end of the head and the piece or material, thereby allowing the separation distance therebetween to only increase, and therefore the pattern of interference fringes exclusively moves towards the opposite end of the illumination axis.

With reference to the bottom graph in FIG. 2c, the position $x_p$ of the pattern of interference fringes along the illumination axis is the intrinsic position of the envelope of the intensity of the optical radiation of said pattern of interference fringes, and this intrinsic position of the envelope of the intensity of the optical radiation of said pattern of interference fringes is—for example—the position of the peak or maximum intensity of the envelope of the optical radiation, or the average position of the photodetectors weighted with the optical intensity of the fringe envelope.

The detection of the fringe envelope may be carried out by means of optical intensity profile demodulation techniques, for example by applying a band-pass spatial filter, or high-pass and low-pass filters in a sequence, so as to reveal the only signal components corresponding to the spatial frequency of the interference fringes. For example, in a first step of processing the optical intensity data, the optical intensity detected by a matrix of sensors is integrated in the direction that is perpendicular to the development direction of the interference fringe, for example for columns of a matrix of sensors oriented so as to receive a pattern of vertically aligned interference fringes (this operation is not required if the sensor arrangement is a linear arrangement of photodetectors on which the beams are focused by means of a cylindrical lens). Subsequently, the signal generated by the photodetectors is normalized with respect to a background signal, for example extracted from an image devoid of interference fringes. Therefore, a high-pass spatial filter is applied, for example to ⅕ of the photodetector spatial frequency in order to remove the baseline and to maintain the pattern of interference fringes. Since, in this way, a signal is obtained that oscillates around zero, the absolute value of the signal is extracted and therefore a low-pass spatial filter is applied, for example to 1/25 of the photodetector spatial frequency in order to extract the envelope of the pattern of interference fringes. The position of the pattern of interference fringes is lastly obtained by detecting the position of the envelope of the fringe pattern by seeking the maximum thereof or by comparing the envelope with a predetermined model function (for example a Gaussian function) and extracting the peak of the model function.

Figure 3:
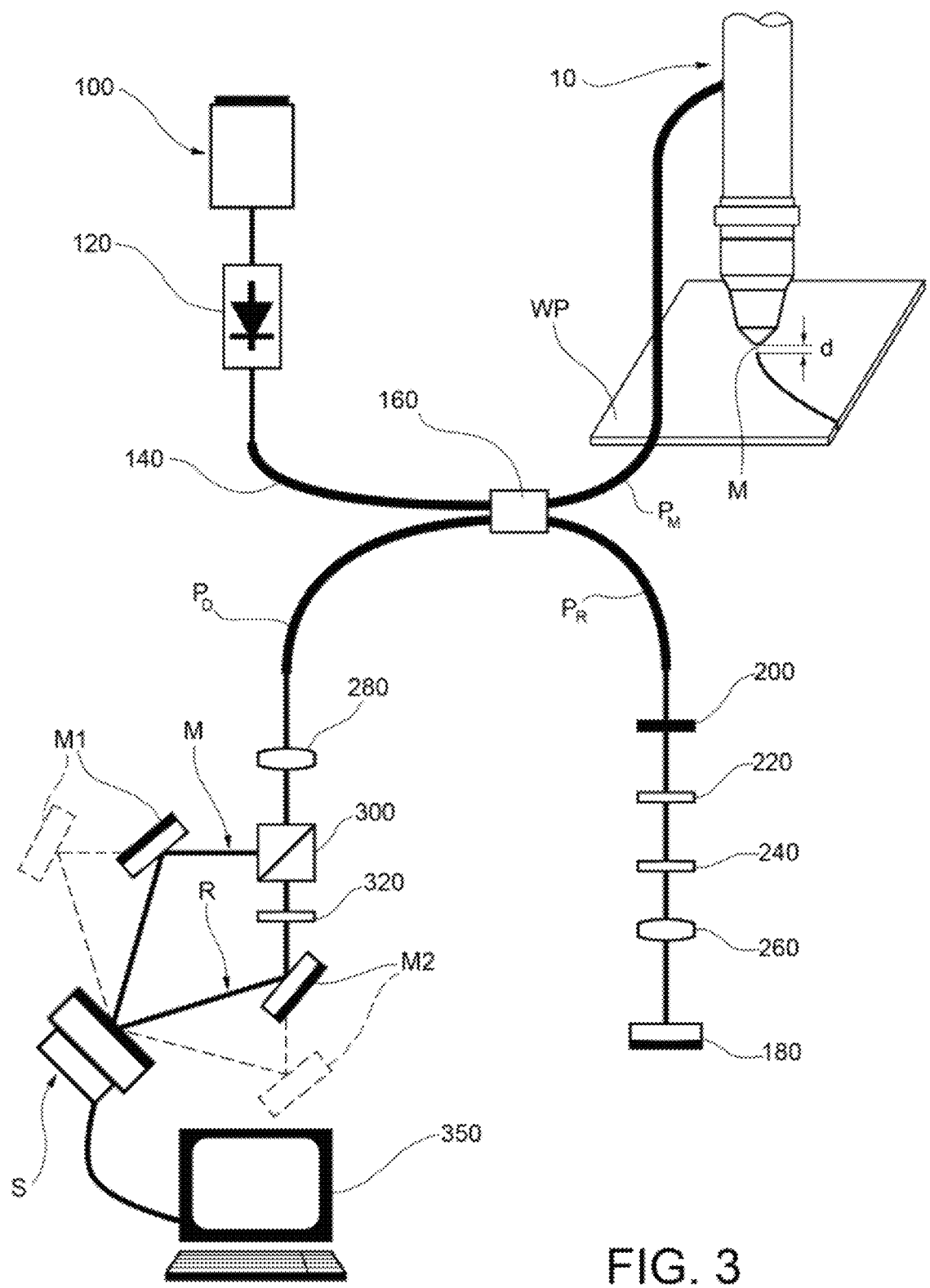
FIG. 3 shows an example diagram of a system for determining the separation distance between a working head of a machine tool and the surface of the piece or material being processed, which forms the subject matter of the present invention.

FIG. 3 shows an example diagram of a system for determining the separation distance between an object or a material and a body that comprises means for processing or measuring said object or material, which forms the subject matter of the present invention, in particular described with reference to an application for determining the separation distance between a working head 10 of a machine for laser processing a piece or material WP and the surface of said piece or material.

In the figure, 100 indicates a low coherence optical radiation source suitably having linear polarization, such as an LED or a super luminescent diode, for example which operates in the visible or near-infrared wavelength range. The optical radiation emitted by the source 100, downstream of a suitable optical isolator 120, is injected into an optical waveguide, for example an optical fiber 140, and carried to a beam splitter 160 that is adapted to generating a measurement beam of optical radiation M, which is routed on a measurement optical path $P_M$, and a reference optical radiation beam R that is routed on a reference optical path $P_R$.

The measurement optical path $P_M$ and the reference optical path $P_R$ are guided paths and include optical guides (for example optical fibers) that are adapted to maintain the same polarization of the beam along the entire path.

The measurement optical path $P_M$ is conducted to the working head 10 of a machine for laser processing a piece or material as described above, and emerges from there towards the piece or material WP being processed, on which it impinges. The region where the measurement beam M is output corresponds to the section of the measurement head, the distance of which from the above-mentioned piece or material is intended to be measured, for example the opening in the nozzle for supplying the flow of assist gas or the output for the laser beam. Of course, if applied to a different type of machine tool for mechanically processing a piece or material or processing it using a fluid, the section of the measurement head, the distance of which from the piece or material is intended to be measured, could be identified as the end of the processing tool or of the nozzle for supplying the operating fluid.

The optical reference path $P_R$ is instead led to a reflective return element 180, preferably by interposing an optical density filter 200, an optical dispersion compensation element 220, a λ/4 plate 240 and a focusing lens 260. The optical reflective element 180 is arranged along the reference optical path such that the optical length of this path from the beam splitter 160 to the optical reflective element 180 corresponds to the optical length of the measurement optical path from the beam splitter 160 to the (reflective) surface of the piece or material WP being processed in an operating state in which said surface is at the preset nominal separation distance $D_{standoff}$ nom from the working head, that is from the end of the working head that is proximal to the piece or material, such as the opening in the nozzle for the assist gas or the beam output.

The measurement and reference optical paths $P_M$, $P_R$ are formed such that the optical radiation travels along these paths in both directions, heading back to the beam splitter 160 after being reflected at the surface of the piece or material WP being processed and at the reflective optical element 180, respectively. The reflection at the surface of the piece or material being processed may be understood as the reflection at an at least partially reflective surface of the piece or material, which occurs when the piece or material is not metal but diffusion or reflection may take place at different depths, consequently allowing an interferometric reading along the entire depth of the object or of the material. In the reference optical path $P_R$, the double passage of the reference beam R through the λ/4 plate 240 brings about a 90° rotation of the linear polarization of the beam, which thereby assumes a linear polarization that is orthogonal to the linear polarization of the measurement beam M. The beam splitter 160 then performs a recombination of the measurement optical beam and of the reference optical beam and directs them, superimposed, along a detection optical path $P_D$ (common to a portion of the measurement optical path and to a portion of the reference optical path) towards the sensor arrangement S.

Both the measurement and reference optical beams are led through a cylindrical focusing lens 280, which may focus the collimated beam in just one direction, in particular the direction orthogonal to the illumination axis of the sensor arrangement, with the aim of concentrating the signal along this axis, thereby optimizing the illumination of the photodetectors, and arrive at a polarizing beam splitter 300 that performs the separation of the measurement optical beam M from the reference optical beam R on the basis of their polarization, directing the first thereof towards a first reflective element M1 and the second thereof towards a second reflective element M2; in this last case by interposing a λ/2 plate 320 that may restore the original polarization. On account of this configuration, the first and the second reflective element M1, M2 direct the measurement optical beam and the reference optical beam towards the sensor arrangement S, respectively, and more precisely towards the common region of incidence of the sensor arrangement, at an angle of incidence a.

The angle of incidence a may be controlled within a preset range of values by means of reflective elements M1 and M2, which are respectively moveable in translation along the axis of propagation of the relative optical beam and in rotation about a axis that is normal with respect to the incidence plane (dashed position in the figure).

As described above, the sensor arrangement S comprises a plurality of photodetector devices, each of which is adapted to emit a particular signal representative of the optical intensity incident thereon, and these signals are transmitted, as a whole, to processing means 350 configured for identifying a pattern of interference fringes F that forms on the common region of incidence C of the sensor arrangement by acquiring the overall incident optical power of the superimposed measurement optical beam and reference optical beam.

Preferably, the measurement optical path and the reference optical path comprise corresponding optical elements, and in particular the reference optical path comprises a reflective return element, the reflective and optical diffusion properties of which correspond to the reflective and optical diffusion properties of the piece or material interposed in the measurement optical path as much as possible. Optical attenuator means and/or optical dispersion means may be provided if need be, which may balance out the intensity and the chromatic dispersion of the reference optical radiation reflected by said reflective return element with regard to the intensity of the measurement optical radiation reflected by the piece or material being processed.

By means of the system in FIG. 3 or equivalent systems, a method is carried out for determining the separation distance between the working head 10 of a machine tool, such as a machine for laser processing a piece or material, and the piece or material WP in the processing regions defined along a predetermined working trajectory T followed by the processing tool emerging from the head (by the processing laser beam emitted by the head).

The method comprises generating a beam of measurement low coherence optical radiation M that is led towards a processing region through the working head 10, and— reflected or diffused by the piece or material WP in the processing region—is led through the working head 10 towards the sensor arrangement S in a first direction of incidence.

When processing metal pieces or materials, it is possible to assume that the measurement optical beam is reflected or diffused at the first surface of the material. In certain cases, for example welding or additive manufacturing processes, instead of the surface of the solid to be welded (or of the substrate), it is necessary to measure the distance from the surface of the molten pool, which represents the first surface of the molten metal. The internal sub-surface layers of the material generate signals in the event of non-metal and semi-transparent materials (ceramics, plastics, biological tissues, etc.), or in the case of painted metals.

The measurement optical radiation beam M in particular travels along a measurement optical path from the source 100 to the sensor arrangement S, which includes two portions having a particular predetermined and invariant geometric length, respectively a first portion between the source 100 and the end of the working head 10 that is proximal to the piece or material WP, and a second portion between the end of the working head 10 that is proximal to the piece or material WP and the sensor arrangement S.

A reference beam R of said low coherence optical radiation is generated by the same source 100, which beam is led towards the sensor arrangement S in a second direction of incidence, at a predetermined angle of incidence with respect to the first direction of incidence of the measurement beam M. The reference beam R travels along a reference optical path $P_R$ having an optical length that is equivalent to the optical length of the measurement optical path $P_M$ in the nominal operating state, in which the distance between the working head 10 and the piece or material WP corresponds to the predetermined nominal separation distance $D_{standoff}$ nom.

The measurement beam M and the reference beam R are superimposed on the common region of incidence C of the sensor arrangement S along a preset illumination axis. The position of a pattern of interference fringes F between the measurement beam M and the reference beam R along the illumination axis on the common region of incidence C is detected by the processing means 350 and makes it possible, as described above, to determine the difference in optical length between the measurement optical path $P_M$ and the reference optical path $P_R$, which is indicative of the difference between (a) the current separation distance between the working head 10 and the surface of the piece or material WP in the processing region, and (b) the preset nominal separation distance.

The method may be carried out in real time during a working process in order to determine the separation distance between the working head and the current processing regions on the piece or material, but also before or after the working process, for example to qualify a piece to be processed or a working process that has been carried out.

Figure 4:
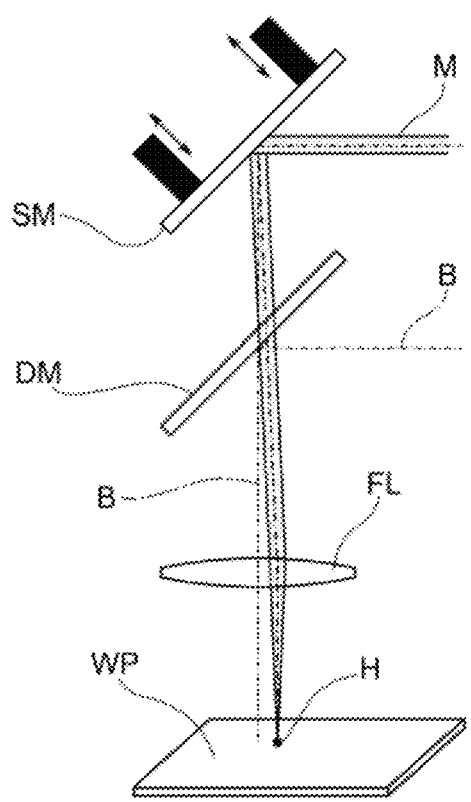
FIG. 4 is a schematic view of an application to a machine for processing a piece or material by irradiating a high-power laser beam, and in particular the processing laser beam path and the measurement low coherence optical beam in the working head according to an exemplary embodiment of the working head of a laser processing machine.
Figure 5A:
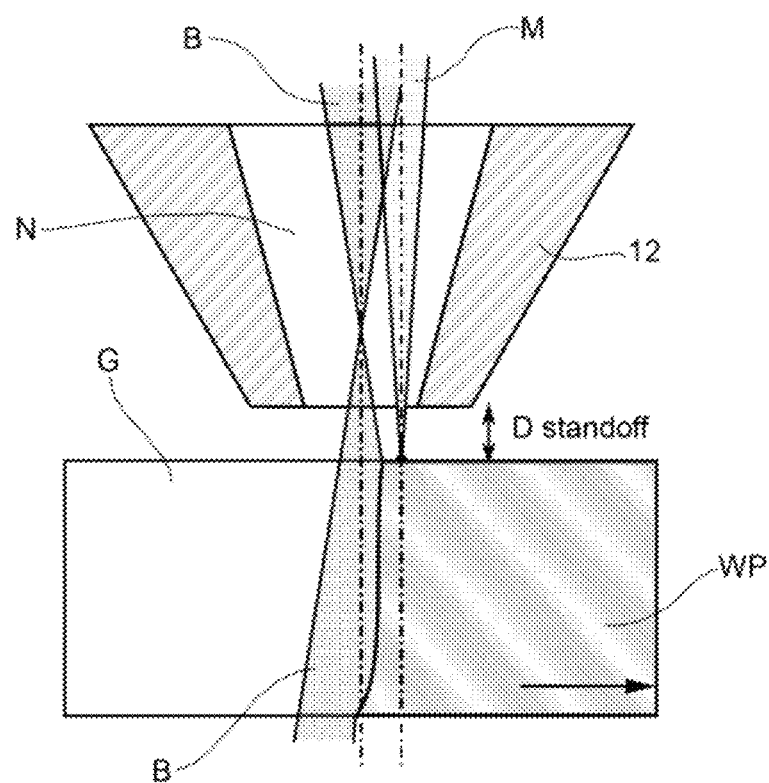
FIG. 5a is a detail of the relative position of a processing laser beam and of the measurement low coherence optical beam at the output of the working head of a laser processing machine in a cutting or drilling portion of the piece or material.

With reference to FIGS. 4 and 5a, an exemplary embodiment of part of a system for determining the separation distance between a working head of a laser processing machine and the surface of the piece or material in a processing region is shown schematically, in particular an exemplary embodiment of the path of the processing laser beam B and of the measurement optical beam M inside the working head and the relative position of the processing laser beam B and of the measurement optical mean M in a cutting or drilling portion of the piece or material WP.

FIG. 4 shows a reflective element that deflects the laser beam, such as a dichroic mirror, indicated by DM, which deflects the optical axis of propagation of the processing laser beam B from a head-entering direction to a direction of incidence on the piece or material WP being processed. This is a configuration that is adopted in one embodiment of the working head comprising a lateral laser beam input. In this embodiment, the measurement optical radiation beam M is directed towards the measurement region of the material—passing through the dichroic mirror DM without substantial deflection—by means of a reflective optical scanning system SM, or folding mirror, the inclination of which is controlled, for example piezoelectrically, on the basis of the absolute value and of the direction of the rate of advancement of the working head along the working trajectory in order to control the position in which the measurement point intercepts the surface. Downstream of the reflective optical scanning system SM there is arranged a focusing lens FL, and therefore it is possible to control the position H in which the measurement point intercepts the surface of the piece or material. As may be seen in the figure, the propagation direction of the measurement beam may be controlled by the inclination of the reflective optical scanning system SM so as not to be coaxially superimposed on the processing laser beam B, but to be different therefrom. A person skilled in the art will also understand that a "dual" or "opposite" configuration is possible, in which a dichroic mirror is provided, which is transparent to the processing laser beam but reflects the measurement beam coming from a lateral input.

Advantageously, in a machine for laser cutting, drilling or welding a material or for the additive manufacture of three-dimensional structures by means of a laser, in which the machine comprises a working head containing a nozzle for supplying a flow of an assist gas arranged near the material, the measurement optical radiation beam is led through the nozzle and directed towards a measurement region of the piece or material that is coaxial with the current processing region or is in the vicinity of the current processing region, preferably in front thereof in accordance with the working trajectory.

Advantageously, in a machine for laser-welding a material or additive manufacture of three-dimensional structures by means of a laser, in which the machine comprises a working head containing an output for the high-power processing laser beam, downstream of an optical system for focusing the laser beam, which system is arranged near to the piece or material, the measurement optical radiation beam is led through the above-mentioned beam output and directed towards a measurement region of the piece or material that is coaxial with the current processing region or is in the vicinity of said current processing region, preferably in front thereof in accordance with the working trajectory.

Conveniently, the incidence of the measurement beam M coaxially with the processing laser beam B is used, for example, to assess the drilling depth, the welding height and the height of the structured material during additive manufacture. The incidence of the measurement beam M in a set-back position with respect to the processing region is used to verify the welding quality or additive depositions. The incidence of the measurement beam M in a forward position with respect to the processing region is used for the early measurement of the separation distance of the head from the piece or material during cutting and welding, or to identify the position of a welding joint along the working trajectory. The latter configuration is shown by way of example in FIG. 5a, where N indicates the nozzle for supplying the assist gas, B indicates the processing laser beam incident in a current processing region of the piece or material WP where a cutting operation is in progress according to a trajectory indicated by the arrow, which forms a groove G, and M indicates the measurement beam. In a cutting operation, the arrangement of the measurement beam M coaxially to the processing beam B would render the measurement extremely uncertain, since it would be taken at the cutting edge, where the wall of the groove in the piece or material has a profile that may not be controlled, which is a function of numerous processing parameters.

Figure 5B:
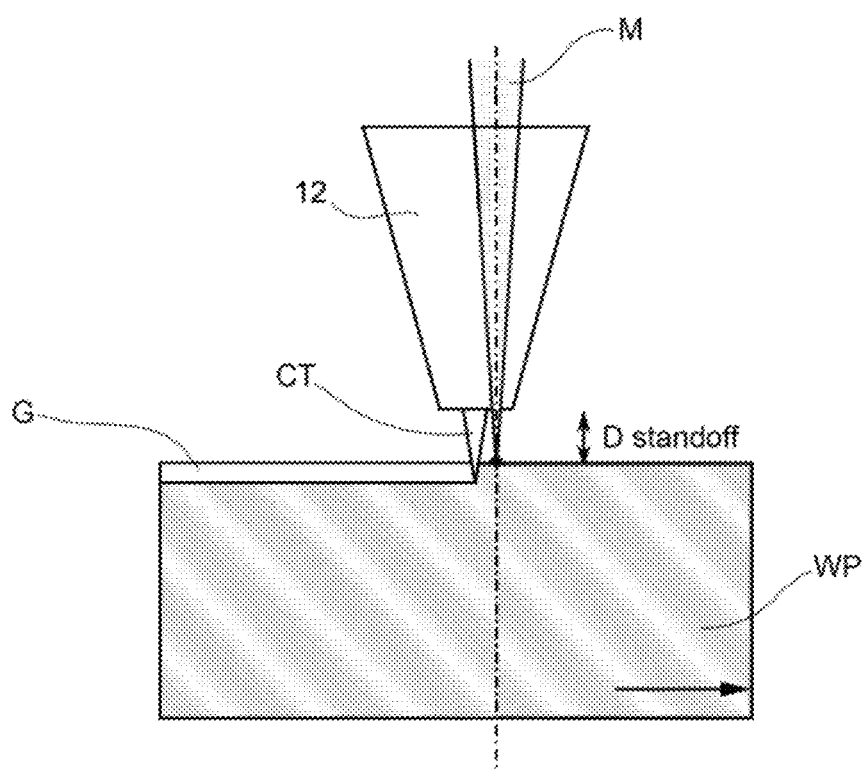
FIG. 5b is a detail of the relative position of a cutting edge and of the measurement low coherence optical beam at the output of the working head of a machine tool for mechanical processing, in an engraving region of the piece or material.

FIG. 5b schematically shows an exemplary embodiment of part of a system for determining the separation distance between a working head of a machine tool for mechanically processing a piece or material and the surface of the piece or material in a processing region, in particular an exemplary embodiment of a cutting edge CT, for example a diamond cutting edge, and of the end part of the path of the measurement optical beam M within the working head of the machine tool and of the relative position of the cutting edge CT and of the measurement optical beam M in an engraving region of the piece or material WP. The direction of the engraving operation is indicated by the arrow, and G indicates the engraving groove produced by the cutting edge CT. In an engraving operation (similarly to a cutting process), the arrangement of the measurement beam M is advantageously forward with respect to the processing region for the early measurement of the separation distance of the head from the piece or material, from which it is possible to deduce the depth of the engraving groove or the intake of the cutting edge CT, for example.

Figure 5C:
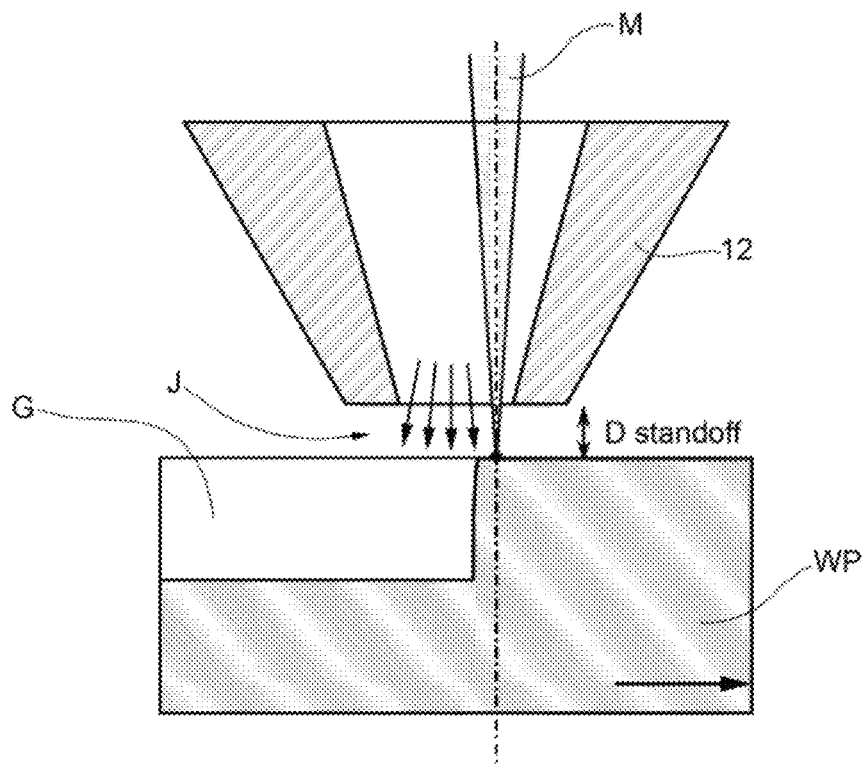
FIG. 5c is a detail of the relative position of an outflow nozzle for an operating fluid and of the measurement low coherence optical beam at the output of the working head of a machine for processing with fluid, in an engraving region of the piece or material.

FIG. 5c is a schematic view of an exemplary embodiment of part of a system for determining the separation distance between a working head of a machine tool for processing a piece or material using a fluid and the surface of the piece or material in a processing region, in particular an exemplary embodiment of an outflow nozzle N of an operating fluid and of the end part of the path of the measurement optical beam M within the working head of the machine and of the relative position of the nozzle N and of the measurement optical beam M in a processing region of the piece or material WP. The direction of the engraving operation is indicated by the arrow, and G indicates an engraving groove produced by the jet of fluid J supplied by the nozzle N. In an engraving operation (similarly to a different type of process, for example polishing or simple cleaning), the arrangement of the measurement beam M is advantageously forward with respect to the processing region for the early measurement of the separation distance of the head from the piece or material.

According to the present invention, in the configuration in which the measurement and reference beams impinge on the common region of incidence of the sensor arrangement S, the angle of incidence α extends to such an extent that the spatial frequency of the pattern of interference fringes is greater than the spatial frequency of the photodetectors in order to increase the range of measurable distances. Advantageously, the incidence angle α may be controlled within a predetermined range of values.

It is known in the art that, assuming that the measurement and reference beams propagate as plane waves, the total light intensity as a function of the x coordinate along the illumination axis of the sensor arrangement S, that is in the plane of the angle of incidence, may be approximated as:

$$I_{tot}(x) \approx I_1 + I_2 \sqrt{I_1 I_2} |\gamma(x)| \cos(k_f x),$$

where $I_1$ and $I_2$ are the intensities of the respective beams and $k_f$ is the wavenumber or spatial frequency of the pattern of interference fringes. Having indicated α1 and α2 the angles of incidence of the measurement beam and of the reference beam with respect to the normal to the sensor arrangement, the spacing between the interference fringes is given by $$\frac{2\pi}{k_f} = \frac{\lambda_0}{\sin(\alpha_1) + \sin(\alpha_2)}.$$

and therefore a greater angle of inclination brings about a greater frequency of the pattern of interference fringes, and therefore a greater interference fringe density on the sensor arrangement.

In order to respect the Nyquist sampling criterion and to avoid the phenomenon of aliasing or sub-sampling, the spatial frequency of the photodetectors, corresponding to the sampling pixel spatial frequency on the sensor arrangement, indicated by $k_p$, has to be at least two times greater than the frequency of the pattern of interference fringes $k_f$, that is the $k_f/k_p$ ratio would have to be smaller than 0.5.

The information about the difference in optical paths may be directly extracted from the position of the envelope of the pattern of interference fringes in the intensity profile of the optical radiation incident on the sensor arrangement. $N_p$ indicates the number of photodetector devices of the sensor arrangement that are illuminated by both the superimposed measurement beam and reference beam; the maximum path difference that may be measured is therefore $$\Delta d_{max} = N_p \frac{\lambda_0}{2} \frac{k_f}{k_p}.$$

whereby the measurement range is directly proportional to the number of photodetectors illuminated by the superimposed beams, which is a consequence of the resolution of the sensor arrangement and of the dimensions of the beams. The increase in the range of differences between the measurable paths is therefore obtainable by increasing the number of photodetector devices, which could introduce greater costs for forming the sensor arrangement and greater expenses for processing the signals originating therefrom. The above-mentioned range of measurable differences is also directly proportional to the $k_f/k_p$ ratio between the frequency of the pattern of interference fringes and the spatial frequency of the photodetectors. The $k_f/k_p$ ratio is dependent on the angle of incidence between the measurement and reference beams and on the spatial dimensions of the photodetectors; it is therefore necessary to achieve a balance between the inclination of the beams and the number of illuminated photodetectors.

The inventors have noted that, depending on the wavelength and the coherence length of the low coherence optical radiation used, several tens of interference fringes are typically visible in a pattern of interference fringes that forms in the common region of incidence of the sensor arrangement. Acquiring a high number of interference fringes across a wide measurement range while respecting the Nyquist criterion requires a large number of photodetectors, which brings about an excessive acquisition of information, since only the position of the envelope of the pattern of interference fringes is relevant for determining the difference between the measurement and reference paths. As a result, the inventors have explored the possibility of demodulating the pattern of interference fringes at smaller and smaller spatial frequencies, which are obtainable with greater and greater incidence angles between the measurement beam and the reference beam, such that the frequency of the pattern of interference fringes becomes greater than the spatial frequency of the photodetectors—a condition that brings about the occurrence of the aliasing phenomenon.

This is substantially a demodulation technique carried out by means of said photodetectors, without the use of masks. In general, a periodic signal in space having a frequency $k_f$, such as a pattern of interference fringes, may be demodulated at lower frequencies by means of the application of a mask or lattice, for example a transmissive or reflective mask, which is also periodic but has a frequency $k_p$ and is interposed along the path incident on the sensor arrangement. In this way, the signal detected by the sensor arrangement is modified by the presence of the periodic mask. As in the prior art, it is possible to calculate the trend of the new signal detected by the sensor arrangement from the convolution between the original signal and said mask. This new signal comprises periodic components having different spatial frequencies to the original spatial frequencies: to be specific, the sum $k_f+k_p$ and the difference $k_f-k_p$ between the spatial frequencies of the signal and of the mask. The component having a lower frequency $k_f-k_p$ is of particular interest since it represents an analogically demodulated signal of the original spatial signal. In the specific case of a fringe pattern demodulated at a lower spatial frequency, this approach makes it possible to detect said pattern using a smaller number of photodetectors to sample it, with an effective reduction in the number of fringes detected.

In the present invention, rather than using an element dedicated to demodulation, the periodicity of the matrix of photodetectors used for sampling the interferometric signal is used in a similar way to a mask, in which $k_p$ is the frequency of the photodetectors or pixels. In a sub-sampling (aliasing) state where $k_f > k_p$, each photodetector (pixel) will obtain the optical signal corresponding to several fringes, and, on account of the effects cited above, will result in a distorted fringe pattern detected at a lower spatial frequency. This lower spatial frequency is reflected in a lower effective number of photodetectors for detecting the entire fringe pattern; therefore the entire extension of the sensor arrangement may be used for operation over a greater measurement range.

Figure 6:
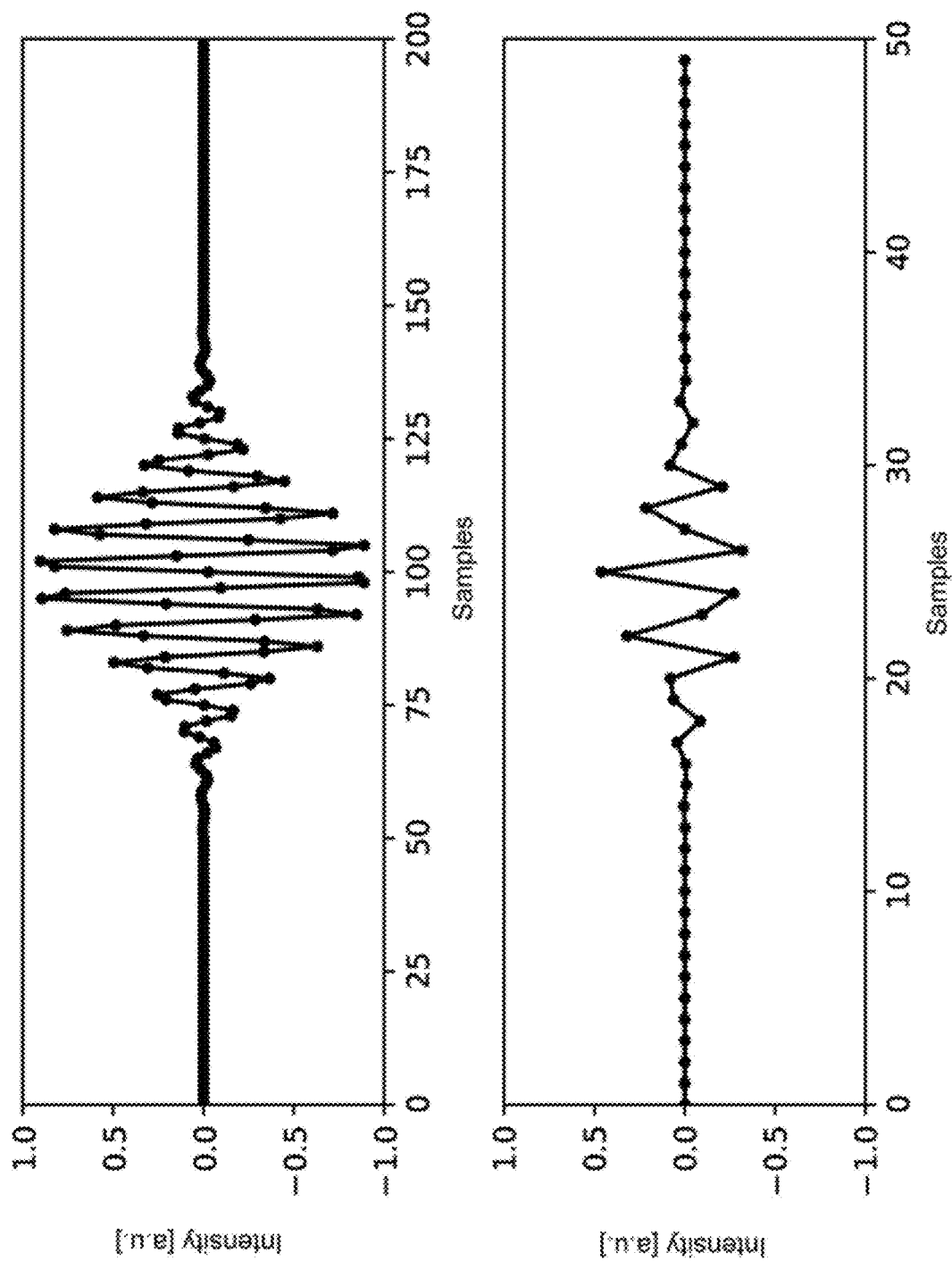
FIG. 6 shows the simulated trend of the intensity of the optical radiation of the same pattern of interference fringes on the basis of the signal samples acquired with and without aliasing.

Taking into consideration a constant number of photodetectors, this approach makes it possible to increase the measurement range without losing information, simply at the cost of a reduced contrast of the interference fringes since a plurality of fringes are detected by a single photodetector. The phenomenon is shown in FIG. 6, in which the graphs show the reconstructed trend for the intensity of the optical radiation of the same pattern of interference fringes, simulated on the basis of the signal samples, indicated by the dots, acquired without aliasing (upper graph) and with aliasing (bottom graph), respectively. As may be noted, although the number of fringes detected varies across the two sampling states, the envelope of the fringe pattern remains almost unchanged.

Figure 7:
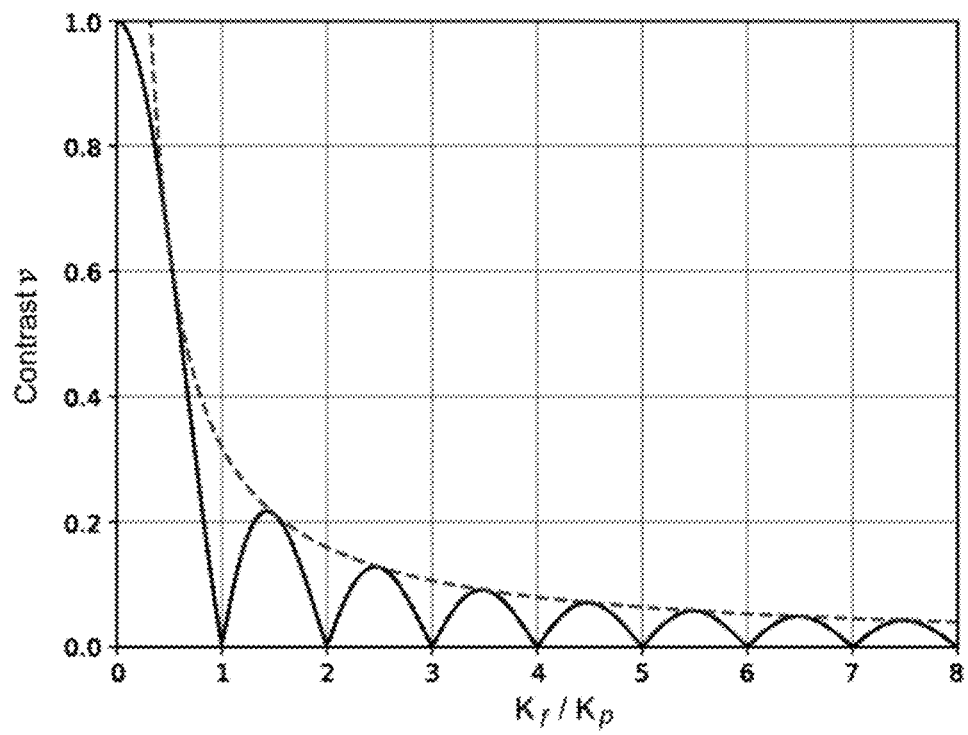
FIG. 7 is a graph showing the trend of the contrast or visibility value for the simulated pattern of interference fringes as a function of the relationship between the spatial frequency of said pattern of interference fringes and the spatial frequency of the photodetectors in a linear arrangement of photodetectors along the illumination axis of the sensor arrangement of the pattern of interference fringes.

It may be proven from the prior art that the contrast v of the interference fringe is dependent on the aliasing factor $k_f/k_p$ according to the relationship:

$$V \approx |\text{sinc}(k_f/k_p)|$$

and is zero at integer multiples of the spatial frequency of the photodetectors $k_p$, as shown in FIG. 7.

Advantageously, in order to have a locally maximum contrast, the spatial frequency of the pattern of interference fringes has to be greater than the spatial frequency of the photodetectors and different from the multiples of the spatial frequency of the photodetectors, preferably close to a half-integer multiple of said spatial frequency of the photodetectors.

In fact, as is clear from the graph in FIG. 7, which shows the trend, as a continuous line, of the contrast v between interference fringes, which trend is calculated as a function of the $k_f/k_p$ ratio, the local maxima are close to the half-integer multiples of the spatial frequency of the photodetectors, but with a rapid decline in the maximum contrast (qualitatively indicated in the figure by the non-continuous line).

Advantageously, it is possible to select angles of incidence between the measurement beam and the reference beam so as to obtain a $k_f/k_p$ ratio that is equal to approximately 1.5 (or approximately 2.5, approximately 3.5, etc.).

Figure 8A:
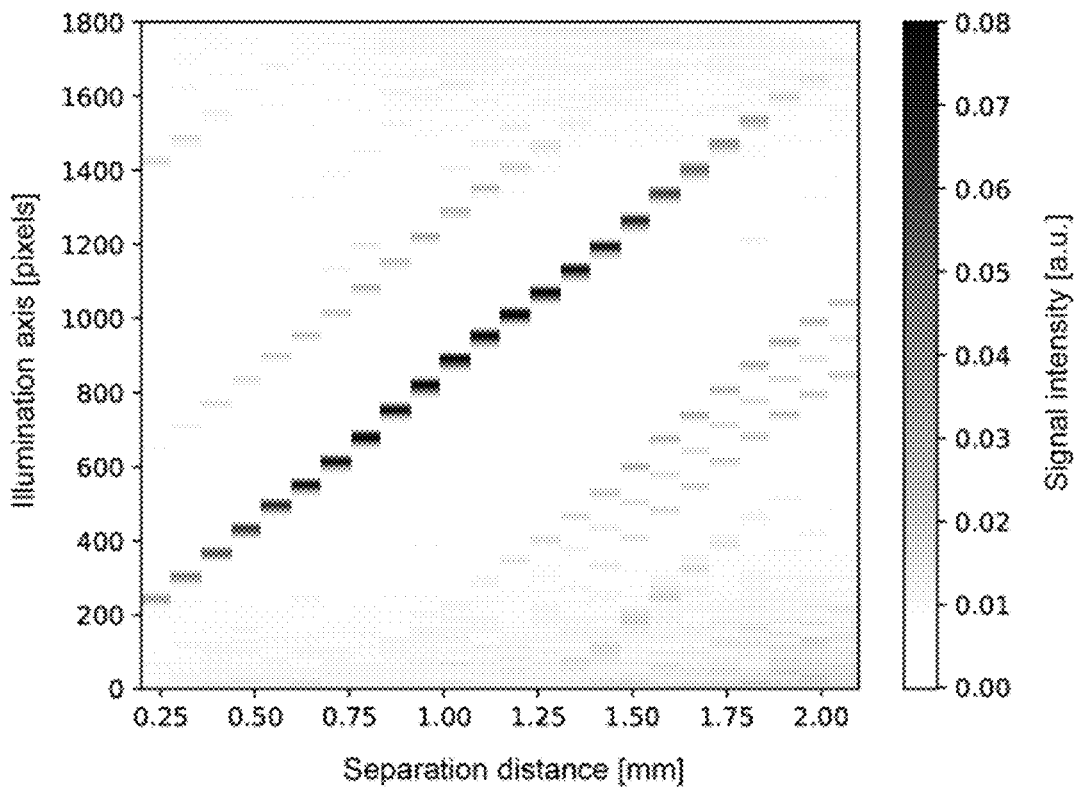
FIG. 8a is a graph showing a signal indicative of the identification of the pattern of interference fringes along the illumination axis of the sensor arrangement as a function of the separation distance between the working head and the piece or material.

FIG. 8a is a graph showing the signals emitted by the photodetectors along the illumination axis of the sensor arrangement S (vertical axis), which signals are indicative of the intensity of the envelope of the pattern of interference fringes that forms on the common region of incidence. In particular, the figure shows the interferometric signals and therefore the spatial position of the pattern of interference fringes along the illumination axis (vertical axis) as a function of the separation distance between the end of the working head and the piece or material facing it (horizontal axis). For example, such a graph may be generated in a calibration step by providing a fixed length of the reference optical path and continuously varying the relative position between the working head and the surface of the piece or material—that is the separation distance of the working head from the surface of the piece or material—along the z axis, and by acquiring interferometric signal readings as a function of predetermined discrete values for the separation distance.

Figure 8B:
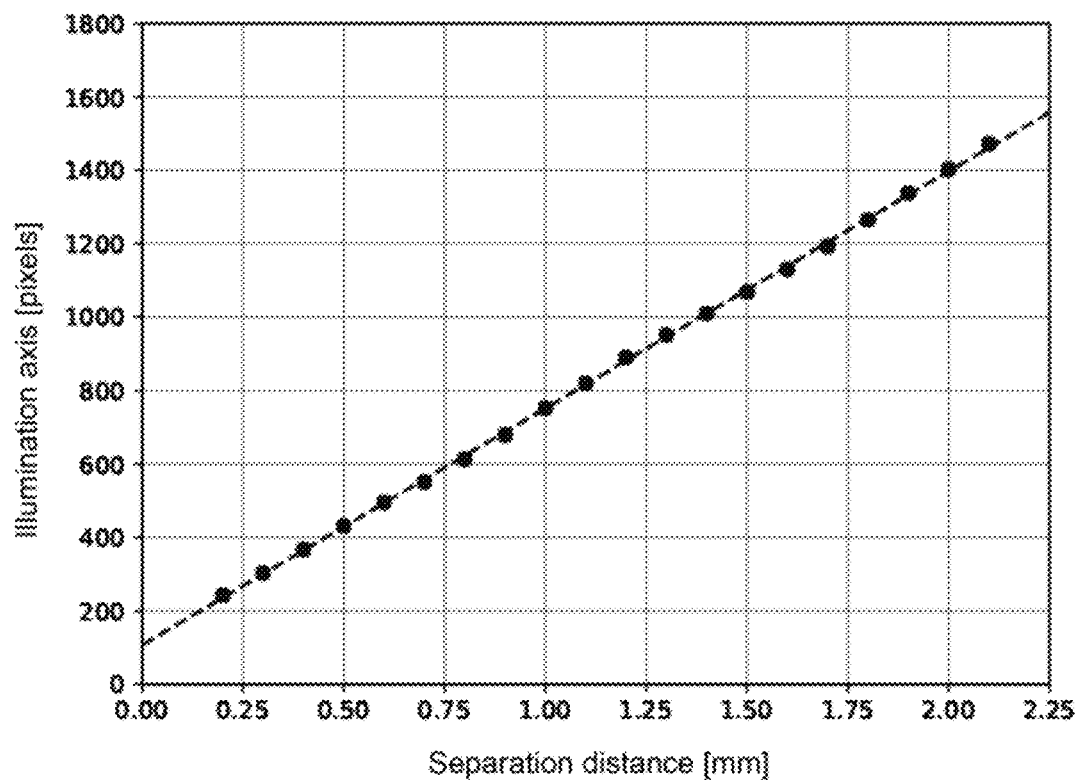
FIG. 8b is an exemplary calibration curve that represents the trend of the peak of the signal indicative of a main pattern of interference fringes as a function of the separation distance between the working head and the material.

The figure shows the acquisition of a strong interferometric signal in the aliasing state and the translation of the envelope of the pattern of interference fringes over a range of approximately 2 mm (corresponding to approximately 1500 pixels) according to an approximately linear trend of the peak of the signal indicative of the pattern of interference fringes, shown in FIG. 8b. The sensitivity may be defined as the separation distance corresponding to the dimensions of a photodetector or pixel of the region of incidence, in this case 1.5 um/pixel. The translation of the envelope of the pattern of interference fringes over the entire illumination axis of the sensor arrangement makes it possible to determine a separation distance between the working head and the surface of the material of from approximately 0.25 mm to approximately 2 mm.

Figure 8C:
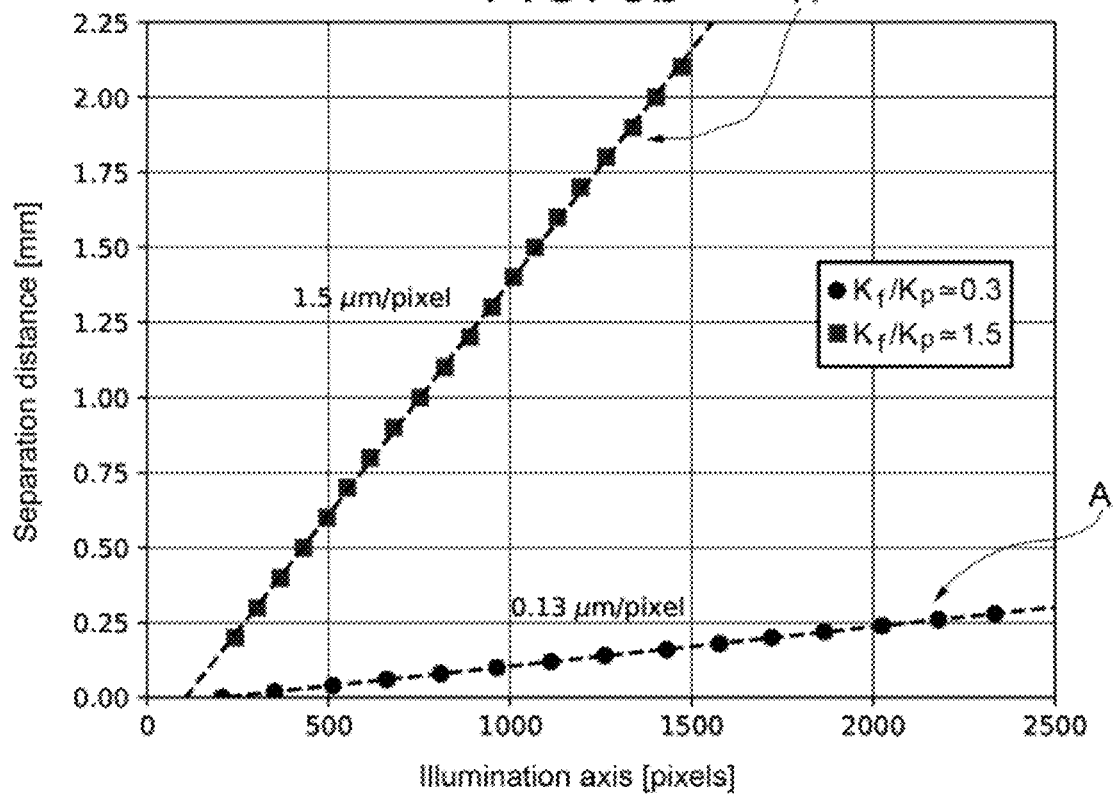
FIG. 8c is a graph comparing the calibration curves that represent the trend of the peak of the signal indicative of a pattern of interference fringes with and without aliasing.

When controlling the angle of incidence between the measurement beam and the reference beam in order to obtain a $k_f/k_p$ ratio that is equal to approximately 1.5, the sensor arrangement makes it possible to determine a separation distance between the working head and the surface of the material of from approximately 0.25 mm to approximately 2 mm, therefore a measurement range of approximately 1.8 mm, which differs from the condition without aliasing, for example for a $k_f/k_p$ ratio that is equal to approximately 0.3, in which the measurement range is approximately 0.3 mm. FIG. 8c is a graph comparing the calibration curves with and without aliasing, respectively indicated as A and A'. With a $k_f/k_p$ ratio that is equal to approximately 4.5, measurement ranges of the order of 5 mm may be achieved.

The accurate determination of the separation distance between a body, such as a working head or a machine tool, and the surface of the piece or material in a processing region, be it a current processing region or a calibration processing region, over an extended range of separation distances, suitably allows the control unit ECU of the machine to also use feedback for the correction or the control of a large separation distance between an object or a material and a body comprising means for processing or measuring said object or material, for example the correction or control of the processing/measuring distance or of other processing/measuring parameters, for example acting on the movement actuator means 14 for controlling the movement of the working head along the Z axis towards or away from the piece or material as a function of a predetermined processing plan and the result of the interferometric measurement. This is particularly useful for improving the efficiency of a processing or measuring process, since the extension of the control range may be obtained simply by adjusting an optical system.

It is noted that the design proposed in the above discussion for this invention is of a purely exemplary nature and does not limit this invention. An expert in the field will be able to easily implement this invention in various embodiments, but which do not depart from the principles set out here, and therefore fall under the present patent.

This is particularly applicable with regard to the possibility of using different low coherence optical radiation wavelengths to those cited, or measurement and reference optical paths having interposed optical elements that are different from those illustrated in FIG. 3 purely by way of non-limiting example.

The principle of the invention remaining the same, embodiments and details of construction may be varied with respect to those described herein, which have been given purely by way of non-limiting example, without thereby departing from the scope of protection as described and claimed.

What is claimed is:

1. A method for determining a separation distance between an object or a material and a processing or measuring tool for measuring said object or material, the method comprising:
generating a measurement beam of low coherence optical radiation, leading said measurement beam towards said object through at least one end of said processing or measuring tool proximal to the object, and leading the measurement beam reflected or diffused from the object through said end of the processing or measuring tool proximal to the object and towards an optical interferometric sensor assembly along a first direction of incidence, wherein the measurement beam travels a measurement optical path from a respective source to said optical interferometric sensor assembly including a first section between said respective source and the end of the processing or measuring tool proximal to the object and a second section between said end of the processing or measuring tool proximal to the object and the optical interferometric sensor assembly having a respective predetermined and invariant geometric length,
generating a reference beam of said low coherence optical radiation, and leading said reference beam towards said optical interferometric sensor assembly along a second direction of incidence, at a predetermined angle of incidence with respect to the first direction of incidence of said measurement beam, wherein the reference beam travels a reference optical path of optical length equivalent to the optical length of the measurement optical path in a nominal operating condition in which the separation distance between the end of the processing or measuring tool proximal to the object and the object corresponds to a predetermined nominal separation distance;
superimposing the measurement beam and the reference beam on a common region of incidence of said optical interferometric sensor assembly, along a predetermined illumination axis;
detecting a position of a pattern of interference fringes between the measurement beam and the reference beam along said predetermined illumination axis on said common region of incidence, whose extension along the predetermined illumination axis corresponds to a coherence length of said low coherence optical radiation; and
determining a difference in optical length between the measurement optical path and the reference optical path, indicative of a difference between (a) a current separation distance between the processing or measuring tool and a surface of the object at the end of the processing or measuring tool proximal to the object and (b) the predetermined nominal separation distance, as a function of the position of said pattern of interference fringes along said predetermined illumination axis of said common region of incidence,
wherein said optical interferometric sensor assembly comprise an arrangement of photodetectors along said predetermined illumination axis, and the predetermined angle of incidence is controlled in such a way that a spatial frequency of said pattern of interference fringes is greater than the spatial frequency of the photodetectors of said arrangement, the spatial frequency of said pattern of interference fringes increasing with an increase of said predetermined angle of incidence resulting in a spatial demodulation of the pattern of interference fringes at a lower spatial frequency as a consequence of a distortion due to sub-sampling, whereby a maximum difference in optical length determinable between the measurement optical path and the reference optical path increases.

2. The method of claim 1, wherein the spatial frequency of said pattern of interference fringes is different from multiples of the spatial frequency of the photodetectors.

3. The method of claim 1, wherein the spatial frequency of said pattern of interference fringes is close to a half-integer multiple of said spatial frequency of the photodetectors.

4. The method of claim 1, wherein said arrangement of photodetectors is a linear arrangement of photodetectors.

5. The method of claim 1, wherein said arrangement of photodetectors is a two-dimensional arrangement of photodetectors.

6. The method of claim 1, wherein a position of an intensity envelope of optical radiation of the pattern of interference fringes along the predetermined illumination axis is an intrinsic position of the intensity envelope of optical radiation of said pattern of interference fringes.

7. The method of claim 6, wherein the intrinsic position of the intensity envelope of optical radiation of said pattern of interference fringes is the position of peak or maximum intensity envelope of said optical radiation.

8. The method of claim 1, wherein said predetermined illumination axis of the common region of incidence is determined by an intersection between a plane defined by said predetermined angle of incidence and a sensing surface of said optical interferometric sensor assembly.

9. The method of claim 1, wherein the measurement optical path and the reference optical path include corresponding optical elements, the reference optical path including a reflective return element corresponding to the object interposed in the measurement optical path, and optical attenuating means adapted to balance intensity of reference optical radiation reflected by said reflective return element with respect to intensity of measurement optical radiation reflected by the object.

10. The method of claim 9, wherein said measurement optical path and said reference optical path originate from a common source, are separated by beam splitting means, led separately to the object and to said reflective return element, respectively, and gathered in a detection optical path, in the detection optical path the measurement beam being separated from the reference beam, said measurement and reference beams being directed with controllable orientation towards said common region of incidence of the optical interferometric sensor assembly, the controllable orientation determining the angle of incidence between the measurement beam and the reference beam.

11. The method of claim 1, wherein said processing or measuring tool is carried by a working head of a machine for laser processing of a workpiece or material operating by a high-power processing laser beam conducted along a working trajectory on the workpiece or material comprising a succession of working areas, and said object is a surface of the workpiece or material at said working areas.

12. The method of claim 11, wherein the end of the processing or measuring tool proximal to the object is a nozzle for dispensing a flow of an assist gas in a working head of a machine for laser cutting, drilling or welding of a workpiece, or for additive manufacturing of three-dimensional structures from a precursor material via laser, and the measurement beam is conducted through said nozzle.

13. The method of claim 11, wherein the end of the processing or measuring tool proximal to the object is an output of a high power processing laser beam in a working head of a machine for laser welding of a workpiece or additive manufacturing of three-dimensional structures from a precursor material via laser.

14. A machine for laser processing of a workpiece or material, operating by a high power processing laser beam emitted by a working head and led along a working trajectory on the workpiece or material comprising a succession of working areas, and comprising means for controlling a relative position between said working head and said workpiece or material, the machine comprising a system for determining a separation distance between said working head and a surface of the workpiece or material at said working areas, arranged to carry out the method of claim 1, said means for controlling the relative position between said working head and said workpiece or material acting according to a predetermined processing design and the determined separation distance between the working head and the surface of the workpiece or material.

15. A system for determining a separation distance between an object or material and a processing or measuring tool for measuring said object or material, the system comprising:
means for generating a measurement beam of low coherence optical radiation;
means for propagating said measurement beam configured to lead said measurement beam towards said object through at least one end of said processing or measuring tool proximal to the object, and to lead the measurement beam reflected or diffused by the object through said end of the processing or measuring tool proximal to the object and towards an optical interferometric sensor assembly along a first direction of incidence, wherein the measurement beam travels along a measurement optical path from a respective source to said optical interferometric sensor assembly including a first portion between said respective source and the end of the processing or measuring tool proximal to the object and a second portion between said end of the processing or measuring tool proximal to the object and the optical interferometric sensor assembly having a respective predetermined and invariable geometric length,
means for generating a reference beam of low coherence optical radiation;
means for propagating said reference beam, adapted to lead said reference beam towards said optical interferometric sensor assembly along a second direction of incidence, at a predetermined angle of incidence with respect to the first direction incidence of said measurement beam, wherein the reference beam travels a reference optical path of optical length equivalent to the optical length of the measurement optical path in a nominal operating condition in which the separation distance between the end of the processing or measuring tool proximal to the object and the object corresponds to a predetermined nominal separation distance;
wherein the means for propagating the measurement beam and the means for propagating the reference beam are arranged to superimpose the measurement beam and the reference beam on a common region of incidence of said optical interferometric sensor assembly, along a predetermined illumination axis;
means for detecting a position of a pattern of interference fringes between the measurement beam and the reference beam along said predetermined illumination axis on said common region of incidence, an extension of the pattern of interference fringes along the predetermined illumination axis corresponding to the coherence length of said low coherence optical radiation; and
processing means for determining a difference in optical length between the measurement optical path and the reference optical path, indicative of a difference between (a) a current separation distance between the processing or measuring tool and a surface of the object at the end of the processing or measuring tool proximal to the object and (b) the predetermined nominal separation distance as a function of the position of said pattern of interference fringes along said predetermined illumination axis of said common region of incidence,
wherein said optical interferometric sensor assembly comprise an arrangement of photodetectors along said predetermined illumination axis, and the predetermined angle of incidence is controlled in such a way that a spatial frequency of said pattern of interference fringes is greater than spatial frequency of the photodetectors of said arrangement, the spatial frequency of said pattern of interference fringes increasing with an increase of said predetermined angle of incidence resulting in a spatial demodulation of the pattern of interference fringes at a lower spatial frequency as a consequence of a distortion due to sub-sampling, whereby a maximum difference in optical length determinable between the measurement optical path and the reference optical path increases.

16. A system for determining a separation distance between a machining tool and a surface of a workpiece or material, the system comprising:
a beam splitter that generates a measurement beam of low coherence optical radiation, the system leading said measurement beam towards said workpiece or material through at least one end of said processing or measuring tool proximal to the workpiece or material, and leading the measurement beam reflected or diffused from the workpiece or material through said end of the processing or measuring tool proximal to the workpiece or material and towards an optical interferometric sensor assembly along a first direction of incidence, wherein the measurement beam travels a measurement optical path from a respective source to said optical interferometric sensor assembly including a first section between said respective source and the end of the processing or measuring tool proximal to the workpiece or material and a second section between said end of the processing or measuring tool proximal to the workpiece or material and the optical interferometric sensor assembly having a respective predetermined and invariant geometric length,
the beam splitter further generates a reference beam of said low coherence optical radiation, and the system leads said reference beam towards said optical interferometric sensor assembly along a second direction of incidence, at a predetermined angle of incidence with respect to the first direction of incidence of said measurement beam, wherein the reference beam travels a reference optical path of optical length equivalent to the optical length of the measurement optical path in a nominal operating condition in which the separation distance between the end of the processing or measuring tool proximal to the workpiece or material and the workpiece or material corresponds to a predetermined nominal separation distance;

wherein the system is configured to superimpose the measurement beam and the reference beam on a common region of incidence of said optical interferometric sensor assembly, along a predetermined illumination axis;

a processor that detects a position of a pattern of interference fringes between the measurement beam and the reference beam along said predetermined illumination axis on said common region of incidence, whose extension along the predetermined illumination axis corresponds to a coherence length of said low coherence optical radiation; and the processor further determining a difference in optical length between the measurement optical path and the reference optical path, indicative of a difference between (a) a current separation distance between the processing or measuring tool and a surface of the workpiece or material at the end of the processing or measuring tool proximal to the workpiece or material and (b) the predetermined nominal separation distance, as a function of the position of said pattern of interference fringes along said predetermined illumination axis of said common region of incidence, wherein said optical interferometric sensor assembly comprises an arrangement of photodetectors along said predetermined illumination axis, and the predetermined angle of incidence is controlled in such a way that a spatial frequency of said pattern of interference fringes is greater than the spatial frequency of the photodetectors of said arrangement, the spatial frequency of said pattern of interference fringes increasing with an increase of said predetermined angle of incidence resulting in a spatial demodulation of the pattern of interference fringes at a lower spatial frequency as a consequence of a distortion due to sub-sampling, whereby a maximum difference in optical length determinable between the measurement optical path and the reference optical path increases.

* * * * *